United States Patent
Grabon et al.

(10) Patent No.: US 7,327,988 B2
(45) Date of Patent: Feb. 5, 2008

(54) WIRELESS COMMUNICATIONS SYSTEM HAVING REDUCED NOISE MODE OPERATION CAPABILITY

(75) Inventors: Robert J. Grabon, Cedar Rapids, IA (US); John K. Rohde, Brown Deer, WI (US); Robert J. Traeger, Solon, IA (US); Patrick R. Erb, Cedar Rapids, IA (US); Daniel E. Alt, Cedar Rapids, IA (US); Daniel J. Klostermann, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 597 days.

(21) Appl. No.: 10/418,190

(22) Filed: Apr. 17, 2003

(65) Prior Publication Data

US 2004/0053578 A1    Mar. 18, 2004

Related U.S. Application Data

(63) Continuation of application No. 08/915,094, filed on Aug. 20, 1997, now abandoned.

(60) Provisional application No. 60/022,880, filed on Aug. 20, 1996.

(51) Int. Cl.
*H04B 1/38* (2006.01)

(52) U.S. Cl. ..................... 455/73; 455/575.1
(58) Field of Classification Search ........... 455/73, 455/74.1, 75, 91, 95, 103, 113, 123
See application file for complete search history.

(56) References Cited

U.S. PATENT DOCUMENTS

| | | | |
|---|---|---|---|
| 4,910,794 A | | 3/1990 | Mahany |
| 4,940,974 A | | 7/1990 | Sojka |
| 4,991,184 A | * | 2/1991 | Hashimoto ................. 375/219 |
| 5,111,451 A | * | 5/1992 | Piasecki et al. ............ 370/294 |
| 5,345,500 A | * | 9/1994 | Breeden et al. ............ 455/458 |
| 5,425,051 A | | 6/1995 | Mahany |
| 5,440,560 A | * | 8/1995 | Rypinski ................... 370/457 |
| 5,465,397 A | * | 11/1995 | Pickert ....................... 455/62 |
| 5,515,036 A | * | 5/1996 | Waraksa et al. ....... 340/825.72 |
| 5,555,266 A | * | 9/1996 | Buchholz et al. ........... 370/347 |
| 5,560,019 A | * | 9/1996 | Narad ....................... 710/260 |
| 5,678,188 A | * | 10/1997 | Hisamura .................. 455/509 |
| 5,765,113 A | * | 6/1998 | Russo et al. ............... 455/557 |
| 5,940,771 A | | 8/1999 | Gollnick et al. |

* cited by examiner

*Primary Examiner*—Duc Nguyen
*Assistant Examiner*—Justin Lee

(57) ABSTRACT

A wireless communication system having a terminal unit operates in a reduced noise state during receipt of a wireless transmission from a control unit. The terminal unit includes terminal circuitry, a radio and noise management circuitry. The noise management circuitry partially or fully disables operation of the terminal circuitry during a receipt by the radio. Noise management circuitry may disable a terminal processor, disable interrupts, buffer interrupts and otherwise modify operation of the terminal circuitry to reduce generated radio noise that would otherwise interfere with receipt of data by the radio. The wireless communication system includes noise management circuitry located in a control unit that operates in conjunction with noise management circuitry in a first terminal unit and a second terminal unit to schedule transmissions from the control unit. These scheduled transmissions allow the terminal units to perform required processing functions outside of the reduced noise period.

6 Claims, 10 Drawing Sheets

WIRELESS COMMUNICATIONS SYSTEM HAVING REDUCED NOISE MODE OPERATION CAPABILITY

CROSS-REFERENCE TO RELATED APLICATIONS

The present application is a continuation of application Ser. No. 08/915,094 filed Aug. 20, 1997, now abandoned, which claims priority pursuant to 35 U.S.C. Sec 119(e) to U.S. Provisional Application No. 60/022,880 filed Aug. 20, 1996, which provisional application is hereby incorporated herein by reference in its entirety.

BACKGROUND

1. Technical Field

The present invention relates generally to wireless communication systems and more particularly to a wireless communication system having noise management circuitry operable to reduce generated noise during receipt of a radio communication. The present invention also relates to transmission protocols and operating modes in a wireless communication system that allow units within the system to selectively operate in reduced noise modes when required.

2. Related Art

Wireless communication systems are well known in the art. In most wireless systems, control units form the basis of a communication cell. The control units act as hubs in facilitating communication with and between terminal units in the cell and also often provide a communication link between the wireless communication system and a wired communication system. Terminal units may include handheld data terminals, code readers, printers, portable computers and various other devices that require communication with other devices in the system. Thus, portable units within the wireless communication system may easily communicate with other wireless units in the system as well as with units connected only to the wired communication system Modern wireless communication systems operate using various transmission techniques that were developed to increase both the speed and accuracy of the transmissions within the system. Some of these techniques, such as frequency hopping, include modifying the frequency of operation of the radios within the system to avoid noisy portions of the transmission spectrum. Other of these techniques, such as code spreading, include encoding and decoding transmissions within the system to increase the likelihood of receiving correct data. In the operation of many wireless systems, however, control units transmitting data and terminal units receiving data are isolated from one another and the strength of received signals is relatively small. Transmitter strength, the physical distance between control unit and the terminal unit, the existence and type of physical obstacles between the units, background noise and various other factors affect the quality and strength of received transmissions. Problems caused by these factors cannot be fully addressed by known techniques.

With the advent of high speed digital circuitry, another communication problem has arisen. Control and terminal units have circuitry that operates at high clocking frequencies. Digital signals produced by the circuitry travel along buses and other conductors within the units and produce radiated noise. Because of the physical proximity between the circuitry and the radios in the units, the radios receive the radiated noise while concurrently receiving wireless communications. The locally generated noise interferes with receipt of the communications and oftentimes requires that data transmission rates be decreased and/or that data corrupted by the noise be re-transmitted.

Shielding of the circuitry within the units does not fully block the radiated noise and adds cost to the units. Further, the modular construction of many units precludes proper shielding.

Thus, there is a need in the art for a wireless communication system that produces minimal generated noise during receipt of wireless communications that may corrupt the communications.

There is a further need in the art for a wireless communication system that operates in various reduced noise modes but that still performing required processing functions.

Thus, it is an object of the present innovation to provide a wireless communication system that selectively operates in a noise reduced state during the receipt of wireless communications.

It is a further object of the present invention to provide a wireless communication system that selectively operates in various noise reduced states based upon its own characteristics as well as the wireless transmission characteristics of the system.

It is still a further object of the present invention to provide a wireless communication system that allows control units and terminal units to cooperatively operate in various modes as required to facilitate satisfactory communications.

SUMMARY OF THE INVENTION

These and other objects of the present invention are achieved in a wireless communication system of the present invention. The wireless communication system comprises terminal circuitry, a radio and noise management circuitry. The noise management circuitry selectively places the system in a reduced noise state during the radio's receipt of a transmission. In the reduced noise state, operation of the terminal circuitry is selectively disabled to reduce or eliminate noise that would otherwise radiate from the terminal circuitry. By reducing generated noise, the radio contained within the terminal unit more effectively wirelessly communicates with other units The noise management circuitry coordinates operation of the system so that the system performs its various other processing functions as well by entering and existing the reduced noise state as is required. When the system also includes a control unit, the control unit coordinates transmissions to facilitate communication and also to allow the system to perform its other required functions.

The teachings of the present invention may be implemented via a set of drivers that selectively operate the wireless communication system. In particular, a software driver resident in the radio may issue interrupts when reduced noise operation is required. At such time, the driver issues interrupts to one or more software drivers resident and operating in the terminal circuitry. Upon receipt of the interrupts, the drivers operating in the terminal circuitry disable one or more functions of the terminal circuitry to reduce generated noise during receipt of a transmission. Upon completion of the receipt of the transmission, the software driver operating in the radio releases the interrupts. Upon release of the interrupts, the drivers operating in the terminal circuitry enable the previously disabled functions.

Reduced noise operation may be synchronized based upon expected transmissions. For example, when periodic signals (such as beacon signals) are intended for the wireless communication system, the radio coordinates reduced noise operation with expected receipt of the beacon signals. Thus, the periodic signals may be received with reduced interference.

Moreover, other aspects of the present invention will become apparent with further reference to the drawings and specification which follow.

BRIEF DESCRIPTION OF THE DRAWINGS

The numerous objects and advantages of the present invention may be better understood by those skilled in the art by reference to the accompanying figures in which.

DETAILED DESCRIPTION OF THE DRAWINGS

Figure 1:
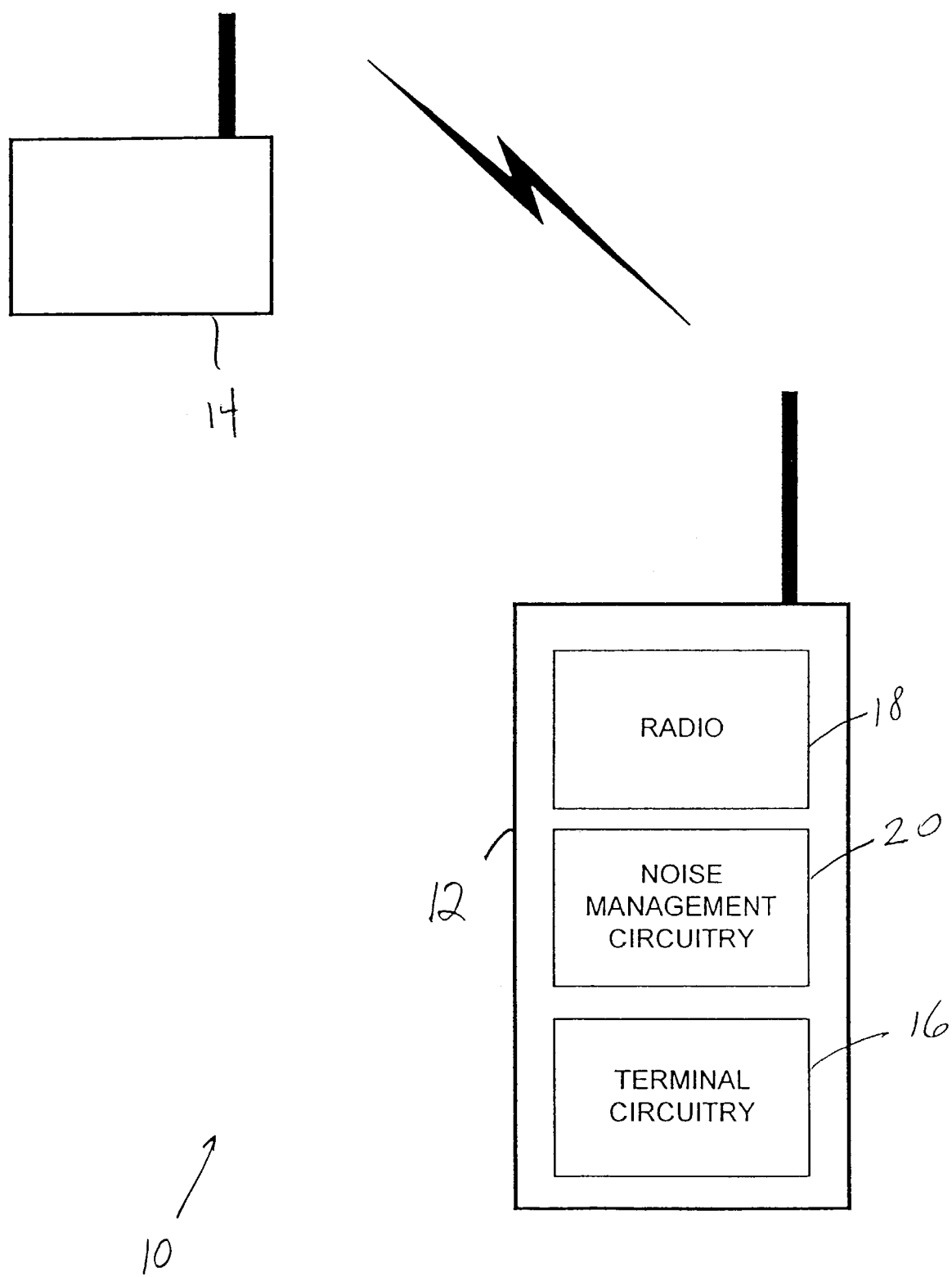
FIG. 1 is a diagram of a wireless communication system of the present invention having terminal circuitry, a radio and noise management circuitry that reduces generated noise during receipt of a wireless communication.

FIG. 1 illustrates a wireless communication system 10 of the present invention having a first wireless unit 12 and a second wireless unit 14. The first wireless unit 12 (hereinafter "terminal unit") includes terminal circuitry 16, a radio 18 and noise management circuitry 20. The terminal unit 12 wirelessly communicates with the second wireless unit 14 (hereinafter "control unit") to pass data back and forth between the terminal unit 12 and the control unit 14. The wireless units 12 and 14 may be stand-alone or may be part of a wireless network in which various wireless units communicate with one another.

The terminal circuitry 16 of the terminal unit 12 performs data processing and various other functions as well as wireless communication functions. The terminal unit 12 may comprise a data terminal, a code reading device, a printer, a scanner, a data input device, a digital camera or another device that performs wireless communication functions. The radio 18 of the terminal unit 12 is capable of interfacing with the terminal circuitry 16 and of wirelessly communicating with the control unit 14. The radio 18 may operate in any various frequency range and may employ various types of modulation techniques and various protocols in its operation.

The noise management circuitry 20 of the present invention operates in conjunction with the terminal circuitry 16 and the radio 18 to selectively disable the terminal circuitry 16 during a wireless receipt by the radio 18. This selective disablement places the terminal circuitry 16 into a "reduced noise state" for a "reduced noise period". The selective disablement may slow the clocking frequency of the terminal circuitry 16, may place the terminal circuitry 16 in a full or partial sleep mode or may alter the operation of the terminal circuitry 16 in another fashion to decrease its output of radio frequency noise that could interfere with the operation of the radio 18. The manner in which the terminal circuitry 16 is disabled depends on the construction of the terminal circuitry 16 and the relative amount of noise it generates in its various modes of operation.

When the terminal circuitry 16 comprises a microprocessor, the noise management circuitry 20 may employ a "sleep mode" supported by the processor. When the terminal circuitry 16 includes additional and/or other conventional circuitry, various techniques may be employed to place the circuitry 16 into a reduced noise state. The noise management circuitry 20 may be partially or fully implemented in software depending upon the terminal circuitry 16 controlled.

The noise management circuitry 20 considers various factors in determining whether, when, and to what extent to disable operation of the terminal circuitry 16 when placing the terminal unit 12 in a noise reduced state. In one mode of operation, the noise management circuitry 20 monitors the strength of incoming radio signals in a reduced noise state and then calculates an attainable signal to noise ratio in a non-reduced noise state. Based upon the expected signal to noise ratio, the noise management circuitry then determines whether to place the terminal unit 12 in a noise reduced state during receipt of subsequent transmissions and/or what portions of the terminal circuitry 20 to disable during the noise reduced state. If the received signal has sufficient strength, the noise management circuitry 20 allows the terminal circuitry 16 to fully operate during receipt of transmissions. However, if the received signal does not have sufficient strength, the noise management circuitry 20 partially or fully disables operation of the terminal circuitry 16 to allow the radio 18 to receive incoming signals.

Figure 2:
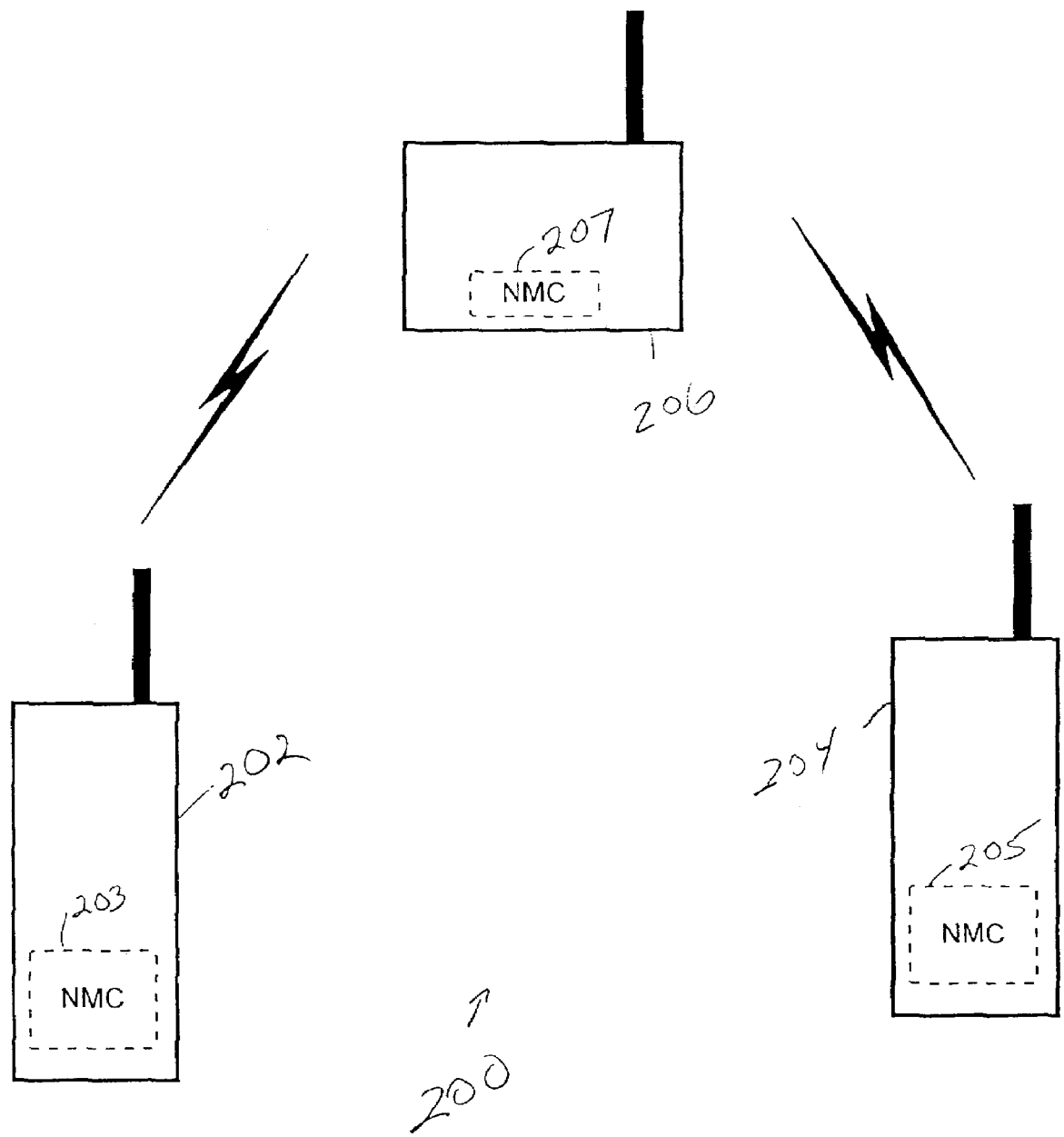
FIG. 2 is a diagram of another embodiment of a wireless communication system of the present invention, the embodiment having two terminal units and a control unit operable in combination to reduce generated noise during receipt of wireless transmissions by the terminal units.

FIG. 2 illustrates another embodiment of a wireless communication system 200 of the present invention comprising a first terminal unit 202, a second terminal unit 204 and a control unit 206. In one configuration, the control unit 206 controls all communications within the system 200. To facilitate these communications, the control unit 206 transmits hello messages, polling signals, data, and various control messages that are received by the terminal units 202 and 204 and used by the terminal units to communicate with the control unit 206. The control unit 206 determines communication protocols, buffers data as required, communicates with other control units and provides a bridge between the terminal units 202 and 204 and a wired network.

The control unit 206 and the terminal units 202 and 204 each include noise management circuitry. The noise management circuitry 207 of the control unit 206 operates in conjunction with the noise management circuitry 203 and 204 of each terminal unit 202 and 204, respectively, to place the terminal units in reduced noise states and to schedule communications between the control unit 206 and the terminal units. Scheduled communications allow the terminal units to perform processing operations when communications are not required but to enter reduced noise states when communications are required. Communication scheduling may include extending polling periods, altering data packet widths, buffering data at the control unit 206 for extended periods and reducing data receipt load on the terminal unit when possible.

The noise management circuitry of the control unit 206 may schedule communications with each terminal unit differently. For example, if the first terminal unit 202 has sufficient received signal strength to perform its normal processing functions during receipt of data, the terminal unit does not enter a reduced noise state during receipt of a transmission from the control unit. Therefore, the control unit 206 may schedule transmissions to the first terminal unit 202 at any time. However, if the second terminal unit 204 has insufficient received signal strength to receive data while its terminal circuitry performs processing functions, the terminal unit must be placed in a reduced noise state when receiving data. Thus, the system 200 has the flexibility to schedule and perform transmissions in differing manners depending upon the constraints of each particular transmission.

Figure 3:
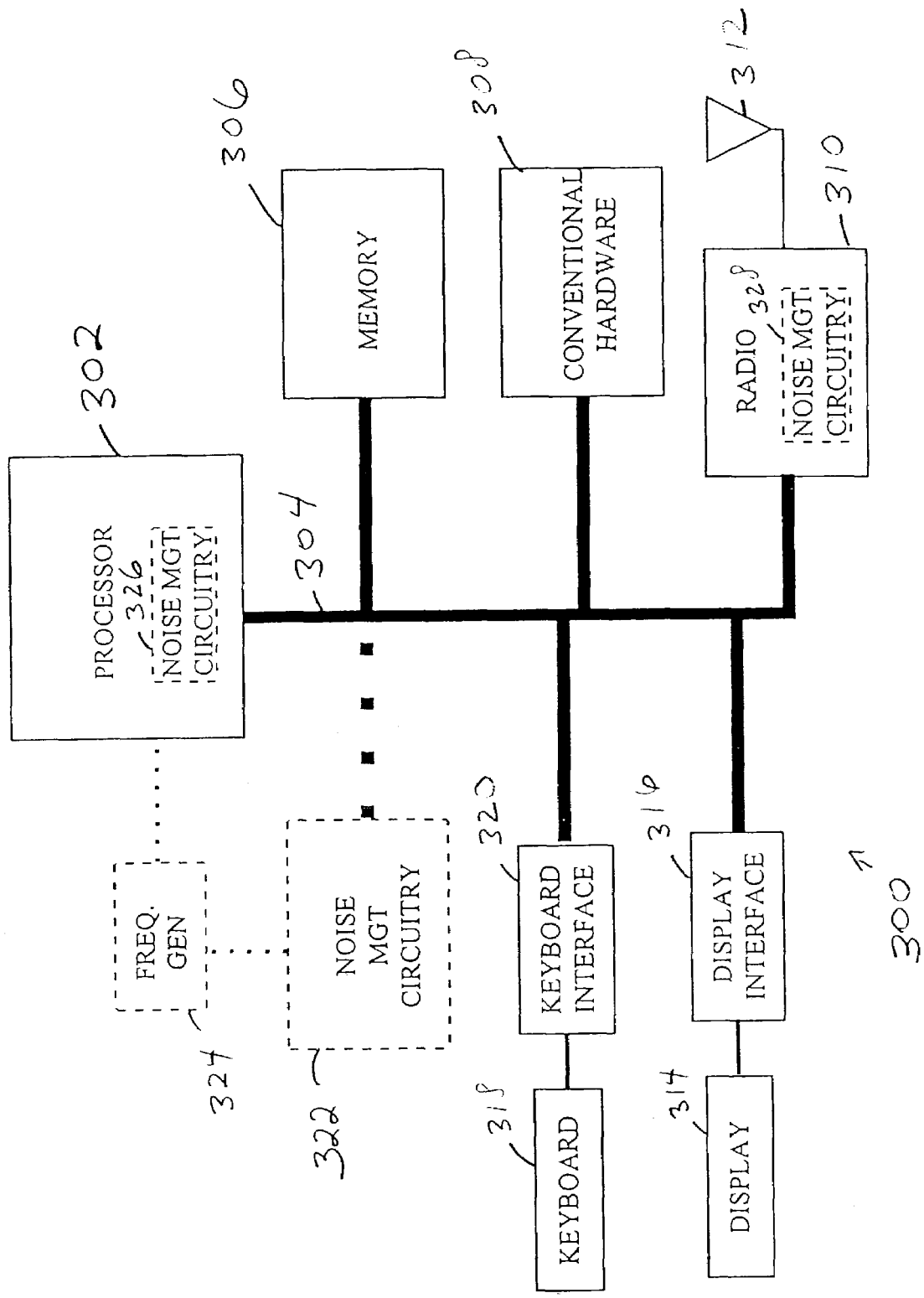
FIG. 3 is a functional block diagram illustrating an embodiment of a terminal unit of the present invention.

FIG. 3 is a functional block diagram illustrating a terminal unit 300 of the present invention. Examples of implementations of the terminal unit 300 include hand-held data terminals, vehicle mounted data terminals, mobile scanning units, printers, cash registers and various other devices that perform data collection and processing functions. The terminal unit 300 includes a processor 302 connected to various other components via a bus 304. The bus 304 includes a data path, a control path and an address path to facilitate communication among the various components connected to the processor 302 by the bus 304. Memory 306 connects to the bus 304 and provides storage capability. The memory 306 may comprise static memory, dynamic memory, read-only-memory of other memory as required. Conventional hardware 308 such as parallel ports, serial ports, universal asynchronous receiver/transmitters (UARTs), battery power circuitry, hard disc storage units, optical storage units, tape drives, network interface cards, code reader interfaces, printer interfaces and or another conventional components may also connect to the bus 304. Display 314 connects to the bus 304 through a display interface 316. Keyboard 318 also connects to the bus 304 through a keyboard interface 320. These components in combination comprise the terminal circuitry of the terminal unit 300, the terminal circuitry facilitating processing functions, user interface functions and communication functions of the terminal unit 300 as well as other functions.

A radio 328 also connects to the bus 304 and provides wireless communication capability to the terminal unit 300 through an antennae 312. The radio 310 employs various modulation techniques such as amplitude modulation, pulse modulation, frequency modulation, on-off-keying, and/or phase modulation depending upon the particular implementation. The radio 310 may facilitate frequency hopping, direct sequence and other frequency spreading techniques to reduce transmission errors. The radio 310 operates in conjunction with the terminal circuitry of the terminal unit 300 to facilitate wireless communications between the terminal unit 300 and other wireless units in the wireless communication system.

The terminal unit 300 further comprises noise management circuitry operably coupled to the terminal circuitry of the terminal unit 300 and the radio 310 that selectively alters operation of the terminal circuitry to reduce generated background noise during a wireless receipt by the radio 310. The noise management circuitry may comprise noise management circuitry 322 standing alone, noise management circuitry 326 within the processor 302 and/or noise management circuitry 328 located within the radio 310. The noise management circuitry may comprise separate physical circuitry, may be functionality implemented within the various components or may be a combination of both.

The noise management circuitry operates to reduce or eliminate noise generated by the terminal circuitry that would otherwise be coupled to the antennae 312 during receipt of a data transmission by the radio 310. Because substantial noise is often radiated by coupling signals to the bus or other conductors, the noise management circuitry selectively reduces or eliminates the coupling of signals to the bus 304 and/or other conductors of the terminal unit 300 when operated.

In one embodiment, the noise management circuitry 322 stands alone and couples to the bus 304 to control operation of the other terminal circuitry components via the bus 304 when required. The noise management circuitry 322 issues instructions and control signals to the various components that may disable or otherwise control their operation to place them in a reduced noise state. If the noise management circuitry determines, perhaps in conjunction with the processor 302 and the radio 310, that the terminal circuitry should enter a reduced noise period, the noise management circuitry transmits control signals to the processor 302, the memory 306, the conventional hardware 308, keyboard interface 320, and the display interface 316 to enter the reduced noise period. During the reduced noise period, the components do not couple signals to the bus 304 or couple signals in a fashion so as to reduce noise, such as coupling the signals at reduced frequencies. Each component coupled to the bus could be controlled separately to enter a reduced noise period. For example, In this embodiment, as well as the other embodiments, the noise management circuitry 322 works in conjunction with the radio 310 to schedule the reduced noise periods of operation with receipts of data.

In another mode of operation, the noise management circuitry 322 controls a frequency generator 324 that provides a clocking signal to the processor 302. During a reduced noise period, the noise management circuitry 322 controls the frequency generator 324 to reduce the clocking frequency provided to the processor 302 or to cease clocking the processor 302 altogether. This mode of operation prevents the processor 302 from placing signals upon the bus 304 that would generate noise that could interfere with the receipt of a wireless communication. In this mode, the noise management circuitry may also control the various other components connected to the bus 304 to preclude them from placing signals on the bus 304 that could generate noise.

The noise management circuitry 326 may be implemented within the processor 302 either functionally or as circuitry. The noise management circuitry 326 may comprise, or operate in conjunction with, various reduced power and sleep modes available with the processor 302. These modes of operation typically shut down all or portions of the processor 302 by shutting down the clock signal or power provided to portions of the processor 302. Typically, this operation precludes bus accesses by the processor 302 thereby preventing the bus from generating noise that could interfere with transmission receipts. In conjunction with enacting these processor functions, the noise management circuitry 326 may also selectively disable the various components of the terminal unit 300 connected to the bus 304 to reduce or eliminate the noise generated by these components as well.

The noise management circuitry may control the operation of the various components connected to the bus 304 individually to disable only those operations that generate interfering noise. Such control could include slowing or stopping the clocking signals provided to a UART, disabling operation of storage devices, disabling printing functions or operation of printing devices, disabling scanning or code reading functions, disabling video functions, disabling battery charging functions, and altering operations of a connected power supply such as switching from a switching power supply to a linear power supply. Other control could include reducing the frequency and level of drive signals provided to the various components, such as the conventional circuitry 308, keyboard interface 320 and display interface 316. Other control could include powering down components, such as connected CD ROM and floppy drives, completely upon initiation of a reduced noise period and leaving the components powered down until required for usage. Further techniques could include disabling operation of a connected keyboard, disabling operation of touch screen input, and disabling operation of other input devices that may generate noise.

In another embodiment, the noise management circuitry 328 resides at least partially within the radio 310. The noise management circuitry 328 places the various components of the terminal unit 300 into a reduced noise period by directing the processor 302 and the other components coupled to the bus 304 to enter the reduced noise state. In the embodiment, the noise management circuitry 328 may operate in cooperation with noise management circuitry 326 located in the processor 302 to cause the terminal unit 300 to enter the reduced noise period. If the processor 302 has master control over the bus 304, the noise management circuitry 328 located within the radio 310 operates in cooperation with the processor 302 to disable or control the operation of the other components connected to the bus. Alternately, the radio 310 may also control the various components, including the processor 302, connected to the bus 304 to initiate the reduced noise period.

Figure 4:
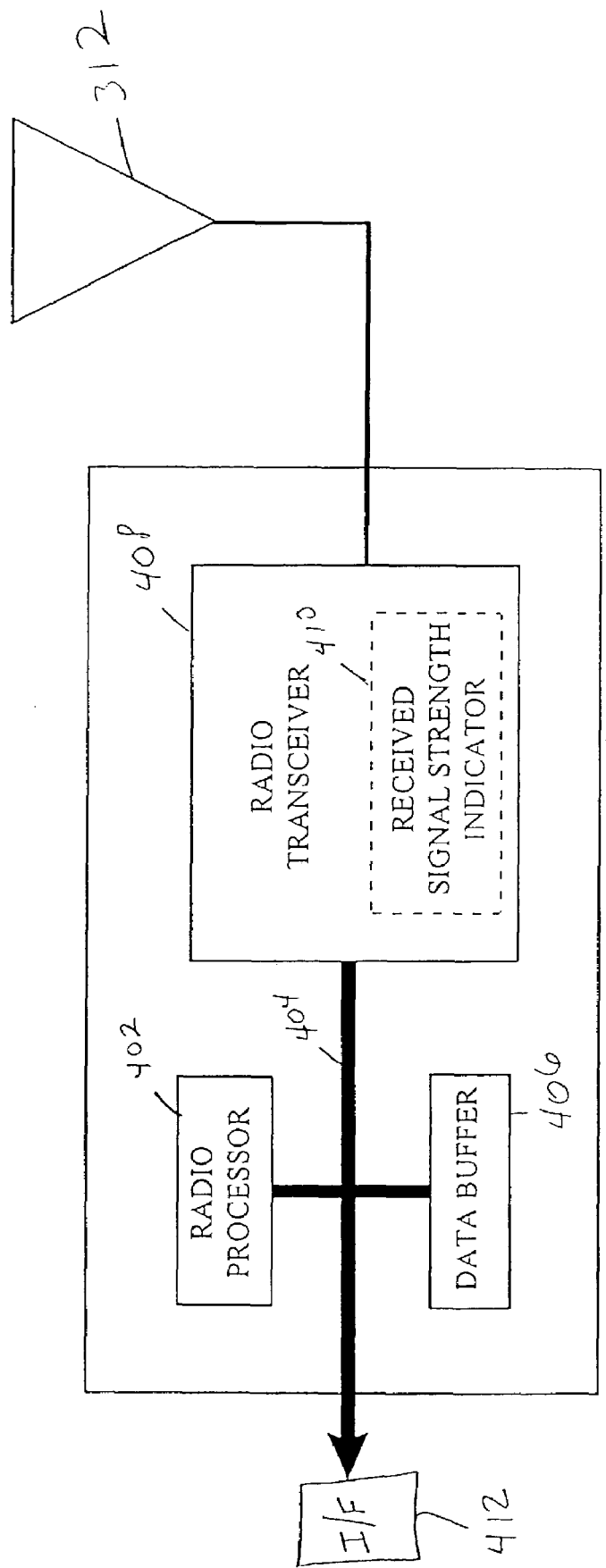
FIG. 4 is a functional block diagram illustrating a radio having a radio processor, a radio transceiver, a data buffer and a received signal strength indicator for use by noise control circuitry in determining whether to enter a reduced noise state.

FIG. 4 illustrates an embodiment of a radio 400 of the present invention. The radio 400 comprises a radio processor 402, radio processor bus 404, data buffer 406 and radio transceiver 408. The radio processor 402 controls operation of the radio transceiver 408, transfers data between the radio transceiver 408 and the terminal unit processor via interface 412 and stores data in and retrieves data from the data buffer 406. Thus, the radio processor 402 controls the operations of the radio 400 to cause the radio 400 to transmit data, receive data, pass data to and receive data from the terminal unit and buffer data as required.

Contained within the radio transceiver is a received signal strength indicator 410 (RSSI). The RSSI 410 monitors the signals received by the radio 400 from the antenna 312 and determines the signal strength of the received signal. The radio processor 402 interrogates the RSSI 410 to determine the strength of the various received signals, relays the information to a terminal unit processor, and may determine whether reduced noise operation is required should the noise management circuitry reside in the radio 400. This determination may be based solely upon the signal strength but may also be based upon the data transmission rate, modulation techniques employed, frequency spreading operations used and also sensitivity of the data to noise.

Factors used to determine whether and when the terminal unit enters a reduced noise state include system data transmission requirements, dynamic radio propagation characteristics for the system and terminal unit locations among others. Some of these factors are common to all terminal units within a system while others are unique to each terminal unit. In accordance with the present invention, each terminal unit may make a determination based upon its own unique factors without receiving any additional factors from a respective control unit. However, the terminal unit could communicate with the control unit and receive pertinent system factors prior to making its determination. As was previously discussed, in a system having multiple terminal units, some units may require operation in a reduced noise mode while other do not. Further, operation in a reduced noise mode may be required at some times but not required at other times depending upon the status of the wireless communication system at the time. Thus, the present invention allows for independent or combined determinations in entering reduced noise states.

During reduced noise periods, the terminal bus 304 may be deactivated. Thus, data received by the radio transceiver 408 must be buffered in the data buffer 406 by the radio processor 402 upon receipt. Once the data receipt is complete, the radio processor 402 retrieves the buffered data from the data buffer 406 and relays the information to the terminal unit processor via the bus interface 412. This sequence of events allows the terminal bus 304 to be disabled during a data receipt when the terminal unit 300 is in a reduce noise state.

Figure 5:
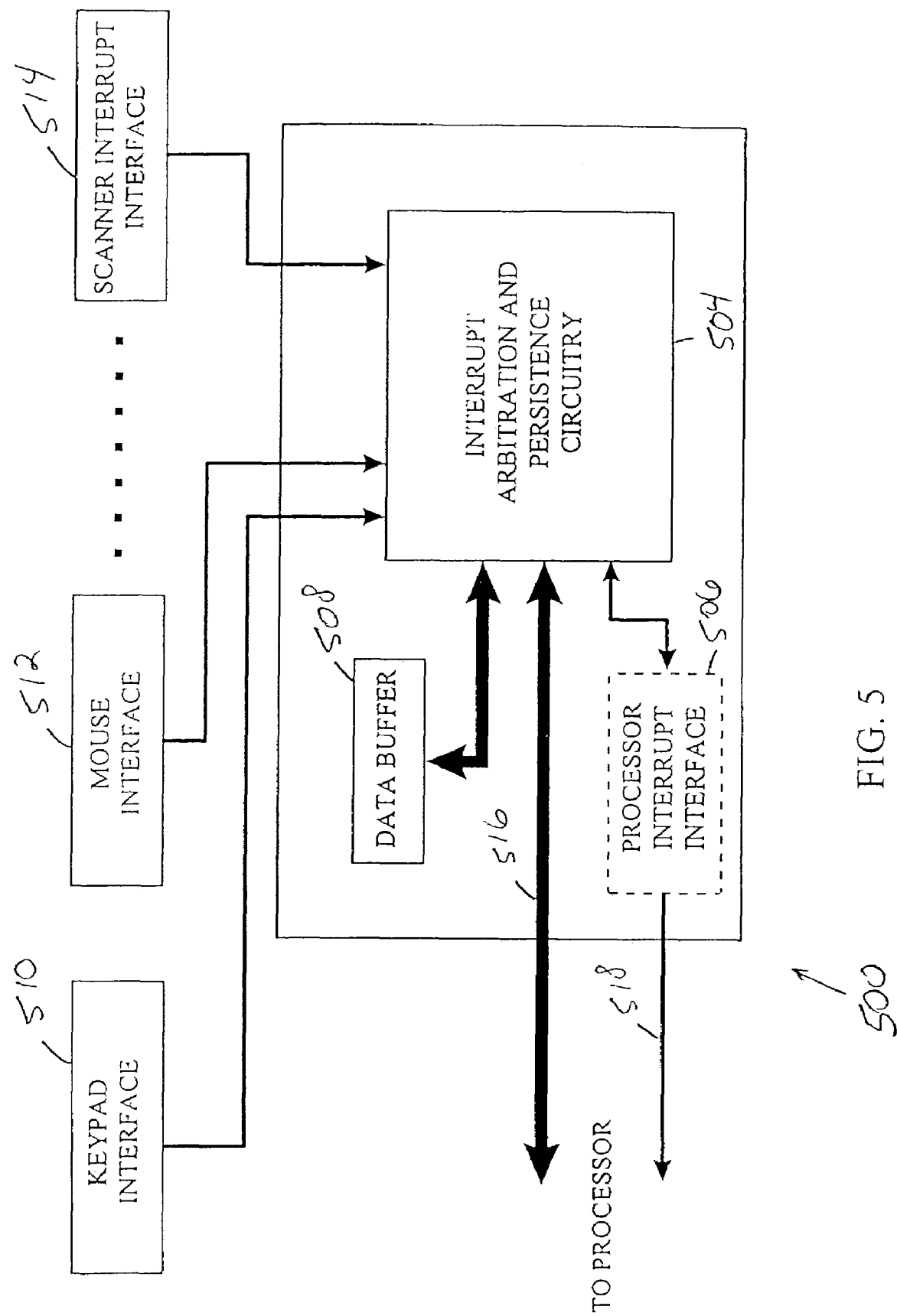
FIG. 5 is a functional block diagram illustrating an interrupt controller that may be contained within a terminal unit of the present invention to control the flow of interrupts, the buffering of interrupts and the persistent assertion of interrupts to other terminal unit components.

FIG. 5 illustrates interrupt control circuitry 500 that may be implemented with the terminal unit of the present invention. The interrupt control circuitry 500 provides interrupt buffering and interrupt persistence so that a system in which the interrupt control circuitry 500 is installed does not miss interrupts asserted during reduced noise periods of operation. The interrupt control circuitry 500 comprises interrupt arbitration and persistence circuitry (IA&PC) 504, processor interrupt interface 506 and a data buffer 508. The IA&PC 504 receives interrupts from various peripheral devices connected to the terminal unit including a keypad interface 510, mouse interface 512, a scanner interrupt interface 514 and various other peripheral devices.

Because these peripheral devices may transmit interrupts to the terminal circuitry at any time, the interrupts may be asserted during reduced noise periods of operation. Interrupts typically produce radio frequency noise when asserted. Thus, it is desirable to prevent the assertion of these interrupts during reduced noise operation. The IA&PC 504 receives the interrupts from the peripheral devices and prevents their assertion during reduced noise periods of operation, helping to reduce generated noise during the reduced noise periods.

However, the interrupts should not be lost when the terminal unit operates in a reduced noise mode. Thus, the IA&PC 504 buffers interrupts in a data buffer 508 for later assertion after the terminal unit has exited the reduced noise period. The IA&PC 504 communicates with the processor and other terminal unit components over a bus 516. The IA&PC 504 may also have direct access to hard-wired control lines 518 through the processor interrupt interface 506. Thus, after the reduced noise period is complete, the interrupt control circuitry 500 may assert interrupts to the terminal unit processor through the processor interrupt interface 506 if any had been received during reduced noise period operation.

During some reduced noise period operation, multiple interrupts may be received from a single peripheral device, such as a keyboard that all go unserviced. Thus, the interrupt control circuitry 500 may buffer a plurality of interrupts received from the peripheral devices and assert them in order of receipt to the terminal unit processor after reduced noise period operation has been released. These interrupts may be persistently asserted until serviced. Thus, in its overall operation, the interrupt control circuitry 500 ensures that interrupts will not be lost when an associated terminal unit is in a reduced noise mode of operation.

In some applications, such as coded image capture and decoding, code reading peripheral devices may have higher priority than the receipt of data. Thus, the interrupt control circuitry 500 may be constructed so that the receipt of the higher priority interrupt from a respective peripheral device causes the unit to exit the reduced noise state, service the interrupt and resume normal processing. In another mode of operation, the high priority interrupt may simply be buffered and asserted earlier than the other interrupts are asserted.

The receipt of some interrupts requires that the system exit a reduced noise period and service the interrupt. Thus, the interrupt controller 500 may, upon receipt of a high priority interrupt such as from a scanning device, signal the noise management circuitry to exit a noise reduced state and service the interrupt.

Figure 6:
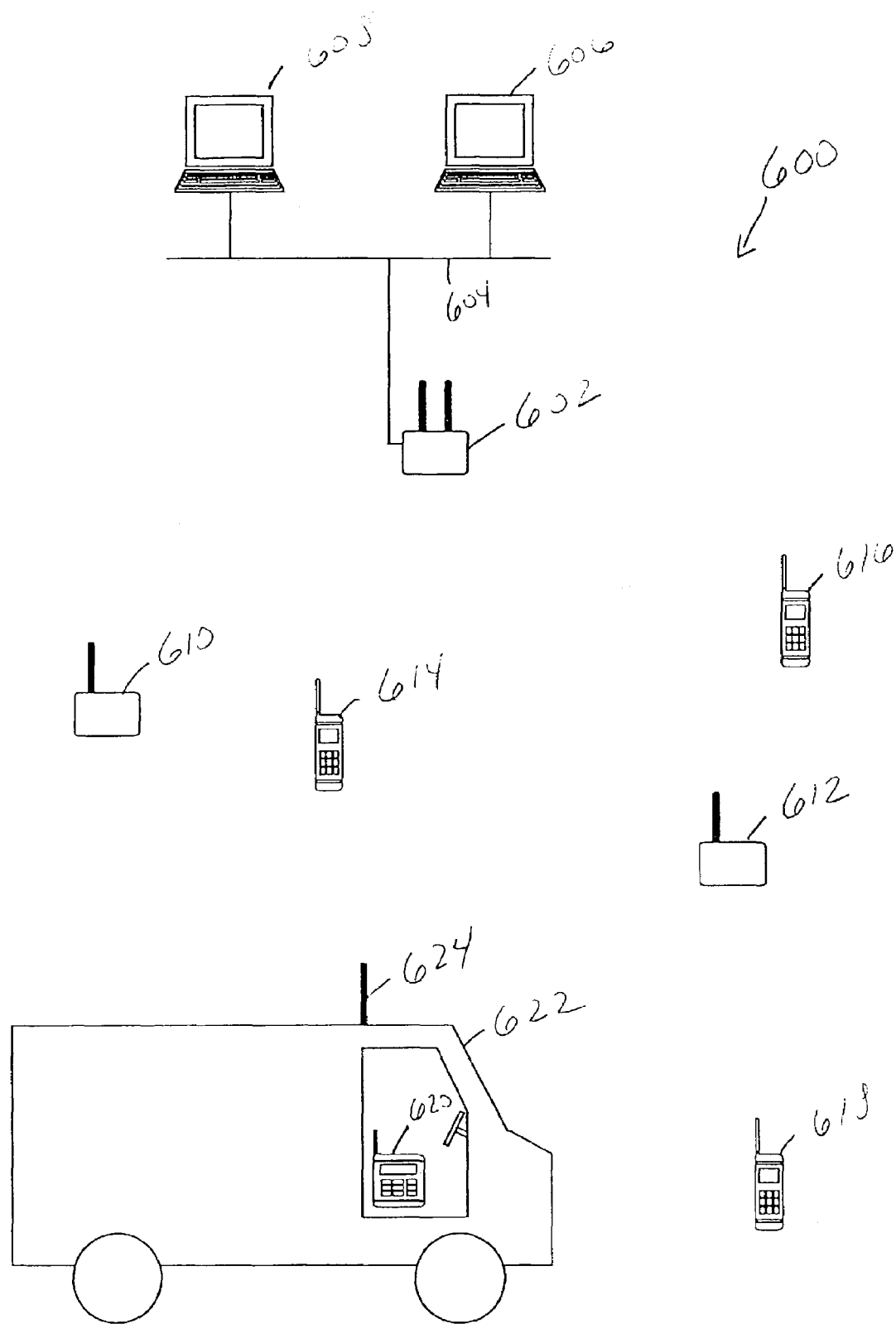
FIG. 6 is a system overview of a wireless communication system comprising a plurality of control units and a plurality of terminal units that allows the various units to operate in reduced noise states as required.

FIG. 6 illustrates a wireless communication system 600 comprising multiple control units and multiple terminal unit. A first control unit 602 connects to a wired network 604 and communicates via the wired network with a computers 606 and 608. The first control unit 602 defines a first cell in the system 600 and provides a wireless link between other wireless units in the system 600 to the wired network 604. As illustrated, the first control unit 602 has two antennas and may wirelessly communicate at differing frequencies. One of these frequencies may be used to communicate with certain of the terminal units and the other frequency may be used to communicate with certain other of the terminal units.

Other control units 610 and 612 operate to define cells within the physical boundaries of the system 600. These control units 610 typically define overlapping cells that provide complete coverage within the physical boundaries of the system 600. Hand-held terminal units 614, 616 and 618 may roam within the system 600 and wirelessly communicate with one or more of the control units 602, 610 and 612 depending upon its physical location and relationship to the control units. Vehicle mounted unit 620 resides within a vehicle 622 that may provide an extra antennae for communication within the system 600.

In operation, any of the terminal units 614, 616 and 618, the vehicle unit 620 or even the control units 602, 612 and 612 may receive data transmissions so weak that if the units performs normal processing functions during receipt, received data is corrupted. Thus, any of the units may enter a reduced noise state prior to receipt of a wireless communication. Typically, however, terminal units and mobile units are most affected by generated noise and most likely required to enter reduced noise periods of operation during receipt.

The terminal units 614, 616, 618 must perform normal processing functions during operation and therefore cannot normally operate in reduced noise periods or enter reduced noise periods without considering whether other processing functions must be performed. Therefore the noise management circuitry of the terminal units cause the units to enter reduced noise periods of operation only when required. As will be further discussed hereinafter, the control units manage communications within the system 600 to facilitate necessary data transfers and to allow terminal units to executed required processing functions as necessary outside of reduced noise states.

Figure 7:
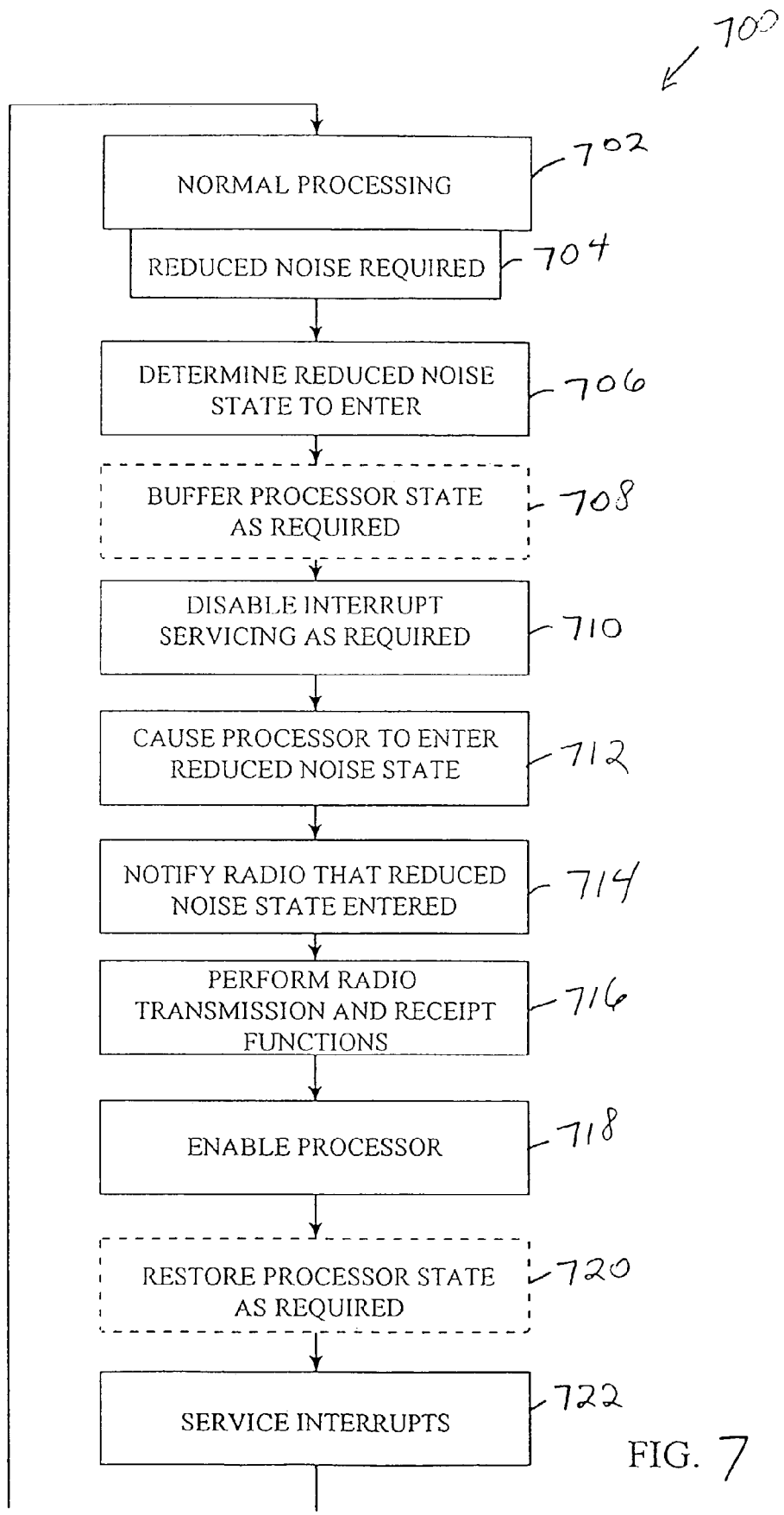
FIG. 7 is a state diagram illustrating operation of a terminal unit when entering and exiting reduced noise states to minimize generated noise during receipt of wireless communications.

FIG. 7 illustrates a mode of operation 700 of a wireless communication system of the present invention. The operation 700 is discussed with respect to a terminal unit. The operation 700, however, applies to any wireless unit that requires reduced noise operation during receipt of a wireless transmission. The terminal unit performs normal processing 702 until reduced noise operation 704 is required. Because reduced noise operation coincides with receipt of data, the terminal unit enters reduced noise operation when receipts of data are expected. The terminal unit expects to receive data when data is queued in a control unit or another terminal unit and will be sent to the terminal unit. The terminal unit may be apprised of such pending communication in a hello message or when polled by a control unit or another terminal unit.

Next, the terminal unit determines which reduced noise state to enter 706 by considering received signal strength, terminal unit processing requirements, received data rates, radio operating frequency, radio operating mode (i.e. whether spread spectrum or other error reduction techniques are in use), prior data receipt error rates and other factors. The terminal unit may determine that full, partial or no reduced noise operation is required. In partial noise reduced operation, for example, the noise management circuitry may reduce the clocking frequency of a processor in the terminal unit or limit bus accesses by the processor. In full noise reduced operation, the noise management circuitry may place the processor in a fully disabled state such as a sleep state. The noise management circuitry may also manage the processor externally by reducing its supplied voltage and/or zeroing the clocking frequency. In either reduced or full noise reduced operation, the noise management circuitry could place the processor into a routine that prevents the processor from accessing the processor bus, thereby preventing the processor from generating noise that could be received by the radio. Duration of a typical noise reduced period from start to finish may be fifty (50) milliseconds. However, the duration depends on transmission requirements for the unit and also its other processing requirements. A heavily loaded data terminal may enter reduced noise periods for shorter periods of time while a printer may be capable of entering reduced noise periods for longer periods of time due to its lesser processing requirements.

If the terminal unit enters a noise reduced state, the noise management circuitry may be required to buffer the processor state 708. Such buffering could be accomplished by storing the state of the processor in memory. The noise management circuitry may also disable interrupts to the processor 710 so that the processor is not interrupted after placing the processor in a reduced noise state. Of course, placing the processor in a reduced noise state must be coordinated with the reduced noise operation of the other components in the terminal unit. These components include peripheral devices and devices connected to the processor bus. Therefore, interrupts from these peripheral units and other units connected to the processor bus should also be prevented from generating radio noise. Design of the noise management circuitry considers how each unit couples to the bus and other control lines within the terminal unit and disables noise producing coupling of signals that exceeds a threshold. Interrupts are disabled accordingly.

Next, the noise management circuitry places the processor and other components within the terminal unit in a reduced noise state 712. The circuitry then notifies the radio 714 that a reduced noise period was initiated. The radio 716 then performs wireless transmissions and receipts 716 as required to receive data from one or more other units. The data receipt operation may include the buffering of data within a radio buffer since the radio may not be able to immediately transfer the data to memory within the terminal unit. However, the radio could also have access to terminal unit memory in a manner that enabled the radio to store received data in memory without generating noise that interferes with the wireless receipt of data.

Once all or a portion of the data receipt is performed, the noise management circuitry determines that the terminal unit should exit the noise reduced state to resume processing. A reduced noise period length determination may have been made at the time of initiating the reduced noise period. The determination may be based upon terminal unit processing levels at the time, projected processing levels and projected duration of the reduced noise period. For example, the noise management circuitry may determine that a reduced noise period may extend for no longer than a maximum duration. The noise management circuitry then causes the terminal unit to enter a reduced noise state for a reduced noise period and then causes the terminal unit to exit the reduced noise state at the expiration of the reduced noise period. Even though all data to be received that was previously queued at another unit has not been received, the noise management circuitry causes the terminal unit to exit the reduced noise state at the expiration of the reduced noise period. The noise management circuitry would then allow the terminal unit to resume terminal unit processing until another determination is made that receipt of data is required, at which time another reduced noise period is initiated. Thus, after the determination is made to exit the reduced noise state, the noise management circuitry enables the processor 718 and restores the processor state 720 if required. The noise management circuitry then services interrupts 722 that were buffered during reduced noise operation and proceeds with normal processing 702 terminal unit further reduced noise state operation is required.

Figure 8:
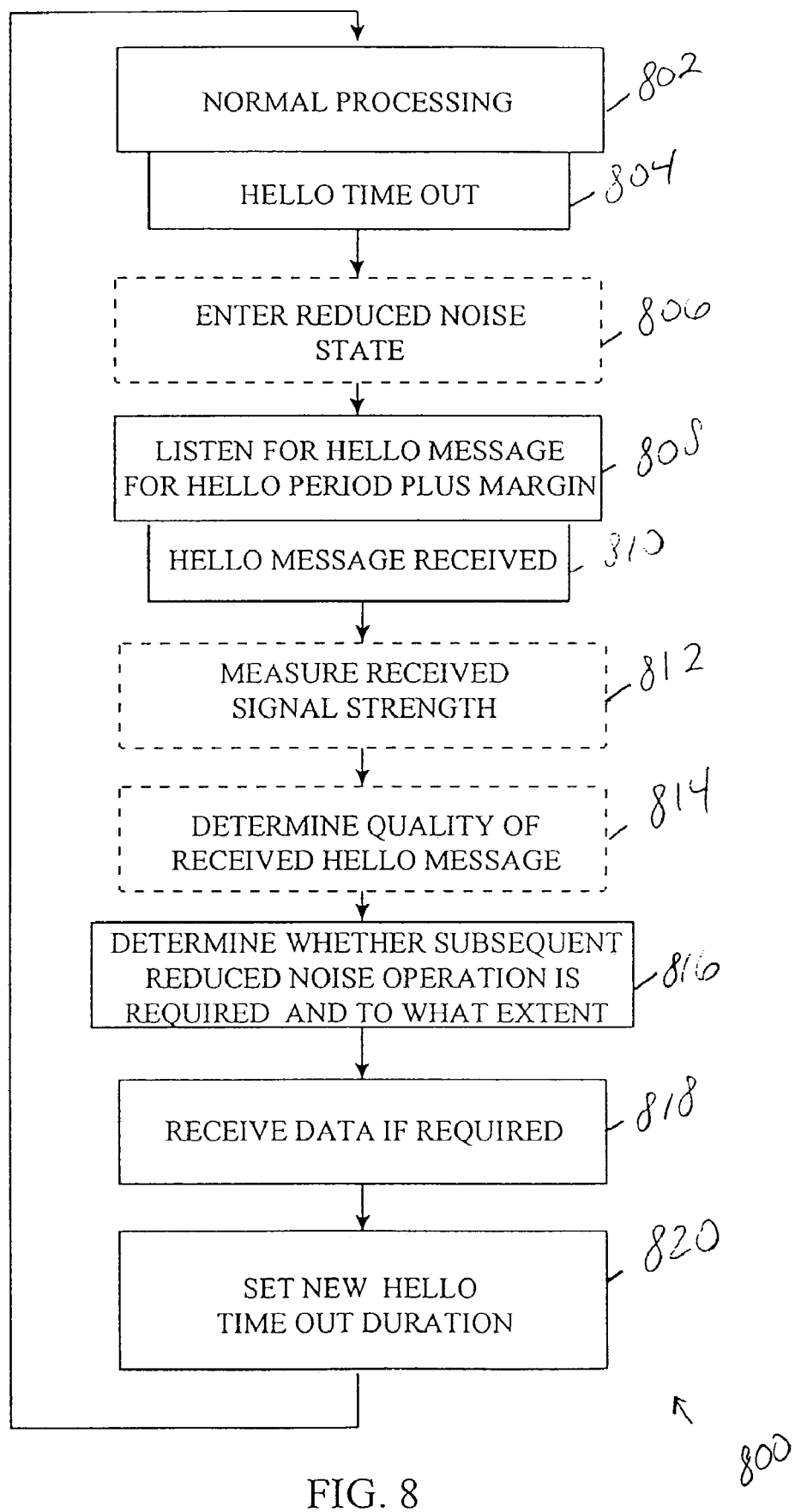
FIG. 8 is a state diagram illustrating operation of a terminal unit in receiving hello messages from a control unit and adjusting its operation based upon the time of receipt of hello message to receive subsequent hello message.

FIG. 8 illustrates operation 800 of a terminal unit in conjunction with a control unit in synchronizing receipt of a hello message and in continued receipt of hello messages thereafter. The operation 800 also describes how the terminal unit uses the receipt of a hello message in determining whether, and to what extent, the terminal unit operates in reduced noise states thereafter. As known, control units periodically transmit hello messages that contain information relating to the control of the cell, radio operations, cell participant information, data queuing information and other information relating to the exchange of data within the cell. Information typically contained within the hello message describes, for each unit in the cell, whether the control unit has data queued for transmission to a respective terminal unit. Thus, by receiving and examining the hello message, each terminal unit determines how to operate in conjunction with the control unit and whether the control unit has data to be received by the particular terminal unit.

The terminal unit performs normal processing 802 until a hello time out occurs 804. During normal operation, the terminal unit has synchronized with the hello messages of the control unit and periodically initiates a hello time out when it expects to receive a hello message. However, prior to synchronization, the terminal unit must listen for a hello message unit until receipt. Thus, at power up, reset or when the terminal unit loses synchronization, the terminal unit initiates a hello time out so that it may synchronize with the hello message.

At initiation of a hello time out 804, the terminal unit may enter a reduced noise state 806. As previously discussed, the noise management circuitry may fully or partially disable functions of the terminal unit upon entering the reduced noise state. In one mode of operation, the terminal unit enters a fully disabled reduced noise state when synchronizing to a hello message from the control unit. Based upon prior operations, the terminal unit enters reduced noise states during subsequent operations.

The terminal unit then listens for a hello period plus a time margin. During synchronization with the hello message, the hello period extends for a full hello message cycle plus a margin to guarantee that the radio receives at least one hello message. After synchronization, the hello period commences marginally prior to the expected hello message and ceases marginally past the expected end of the hello message. Thus, the radio listens for a period of time that encompasses the expected receipt of the hello message. During the hello period, the hello message is received 810 unless the terminal unit is outside of the range of any control unit.

After receipt, the received signal strength of the hello message may be determined 812. Further, the quality of the hello message may also be determined 814. These determinations, as well as other criteria are then used to determine whether, and to what extent, subsequent reduced noise operation is required 816. Further, if the hello message indicates that the control unit possesses data to be transmitted, the terminal unit receives the data 818.

The terminal unit then sets a new hello time out duration 820 based upon the receipt of the current hello message, the processing requirements of the terminal unit and whether reduced noise operation is required. If the processing requirements of the terminal unit are great, the time out duration may be set for multiple hello message cycles so that the terminal unit may perform processing without being interrupted to enter a reduced noise period and receive a hello message.

Figure 9:
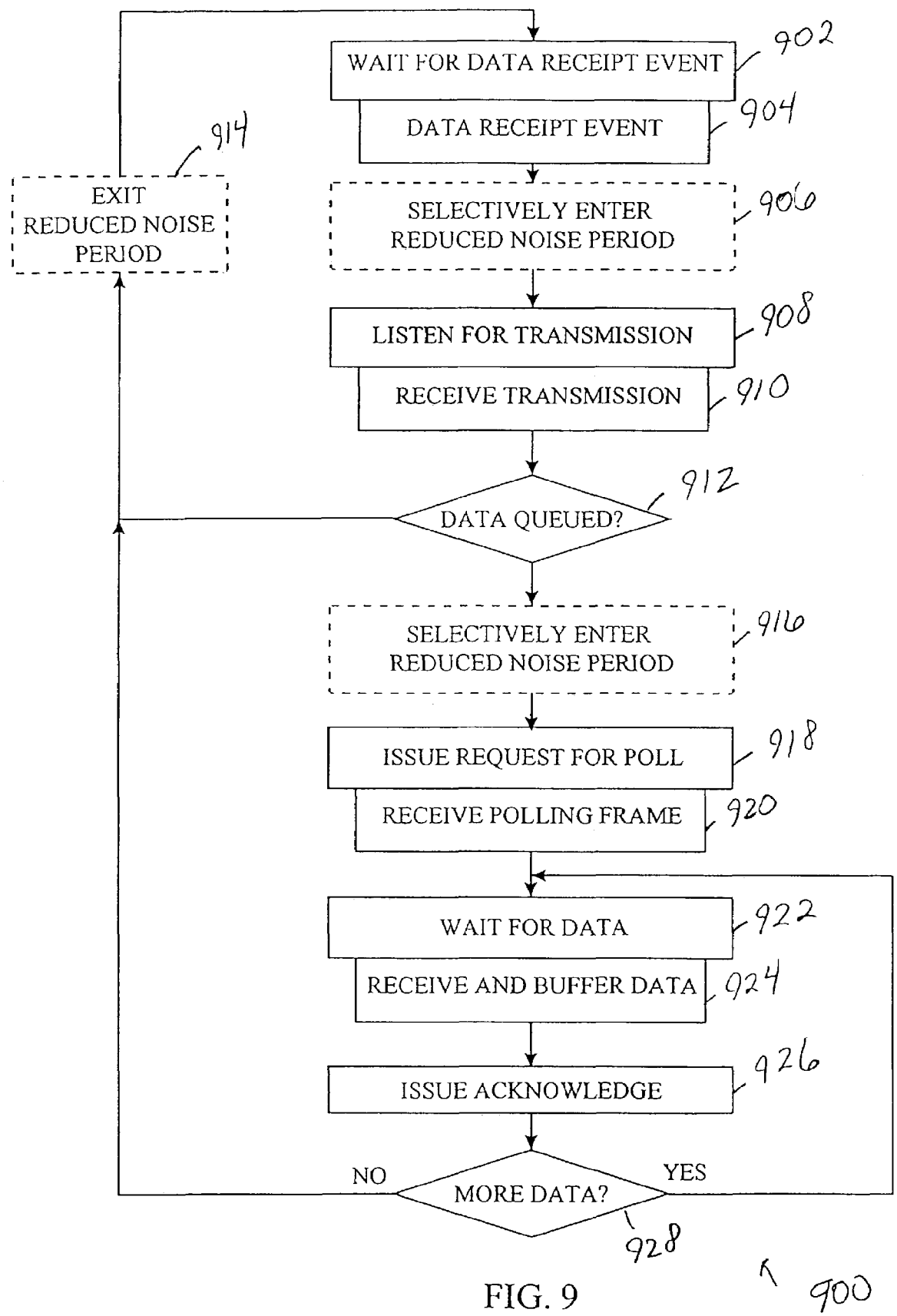
FIG. 9 is a state diagram illustrating operation of a terminal in receiving and buffering data during a wireless transmission receipt unit.

FIG. 9 illustrates operation 900 of a terminal in a wireless communication system of the present invention to exchange data. The terminal unit performs normal processing functions while waiting for a data receipt event 902. The data receipt event could comprise receiving a hello message from a control unit or could comprise receiving a data transmission request from the control unit. Hello messages and their receipt has been previously described. Wireless communication requests are those signals sent by the control unit that notify a respective terminal unit that communication is desired.

After the data receipt event at 904 the terminal unit selectively enters a noise reduced period in preparation for the receipt of a transmission from a control unit. The terminal unit then listens for the transmission 908, receives the transmission 910 and processes the transmission. In one mode of operation, a radio processor processes the transmission to determine if data is to be received by the terminal unit 912. If no data is to be received by the terminal unit, the noise management circuitry of the terminal unit causes the terminal unit to exit the noise reduced period 914 and return to normal processing to wait for the next data receipt event.

If data is to be received, the terminal unit enters a noise reduced period 916 if it has not already done so. Next, the terminal unit issues a request for poll to the control unit 918, thereby making a request to receive data. The request for poll contains information relating to the pending communication, including information relating to transmission protocols, data transmission rates, data frame sizes, number of data frames be transmitted, period between polling signals, whether data is to be transmitted after each polling signal and other information relating to the data transmission.

The control unit receives the request for poll and issues a polling signal to the terminal unit responsive to the request for poll. The terminal unit receives the polling signal 920 and coordinates its data receipt responsive to the information contained in the polling signal. The terminal unit then waits for the data 922 preparing its radio to receive the communication. The terminal unit then receives and buffers the data 924 and issues an acknowledgment 926 based upon its receipt of the data. The acknowledgment may also include direction to the terminal unit to cease further transmissions.

If continued data receipt is desired by the terminal unit and if more data is available for receipt 928, the terminal unit waits for more data 922, receives more data 924 and acknowledges the receipt. Once all data is received, the terminal unit and control unit communicate to one another that the transmission is complete, the terminal unit exits the reduced noise period 914 and resumes normal processing 902.

At any time during receipt of transmissions, the terminal unit may be interrupted by a higher priority event such as the request for a coded image read by a scanning unit. In one mode of operation, upon receipt of the higher priority interrupt, the terminal unit exits the reduced noise state, terminates the communication and services the interrupt. However, in another mode, the terminal unit simply exits the reduced noise state and services the interrupt while continuing to receive the transmission. Of course, by continuing to receive the transmission while servicing the higher priority interrupt, received data may be corrupted.

Figure 10:
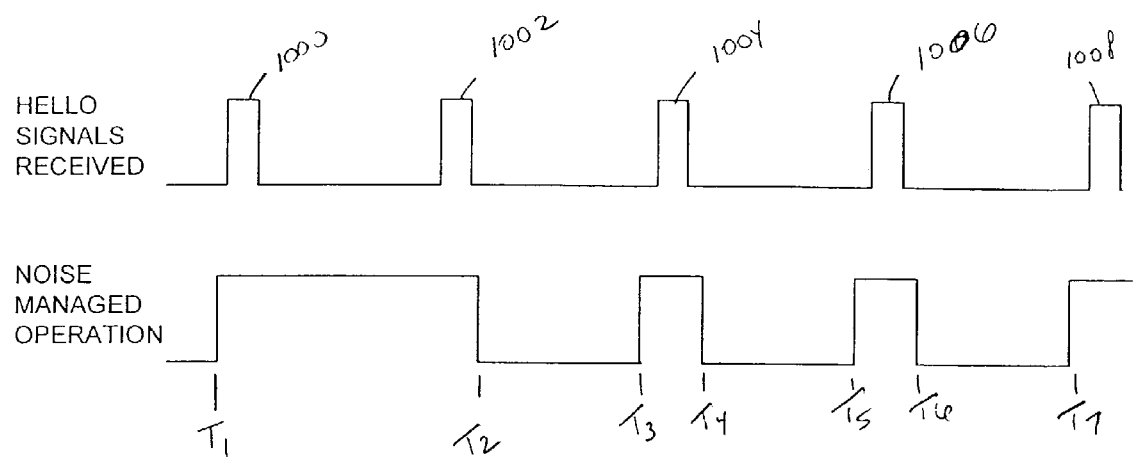
FIG. 10 is signal transition diagram illustrating the selective enablement of a radio of a terminal unit to receive a hello message but to otherwise operate in a reduced noise state.

FIG. 10 illustrates the timing of events in the operation of a terminal unit with respect to the receipt of hello messages. At time $T_1$ the terminal unit has powered up, been reset, or has otherwise lost synchronization with hello transmitted from a control unit. Thus, the terminal unit first commences a noise reduced period and then listens for the hello message for an extended period to guarantee that the terminal unit receives at least one hello message (1000 and/or 1002). After synchronization with at least one hello message, the terminal unit exits the reduced noise period at time $T_2$ and commences normal processing functions. The terminal unit does not listen for another hello message until time $T_3$ which is slightly before it expects to receive a next hello message. The terminal unit commences a reduced noise period, receives the next hello message 1004 and then exits the reduced noise period at time $T_4$ to resume standard processing functions. The terminal listens for the next hello message 1006 between time $T_5$ and time $T_6$ in a reduced noise state. The terminal unit enters another reduced noise period at time $T_7$ to listen for hello message 1008. Between times $T_2$ and $T_3$, between times $T_4$ and $T_5$, between times $T_6$ and $T_7$, and during subsequent respective points in time, the terminal unit operates outside of the reduced noise state and accomplishes all normal processing functions. Thus, by listening for hello signals only during the synchronized reduced noise periods, the terminal unit may operate without missing important communications from the control unit and may perform necessary processing functions outside of these periods.

Figure 11:
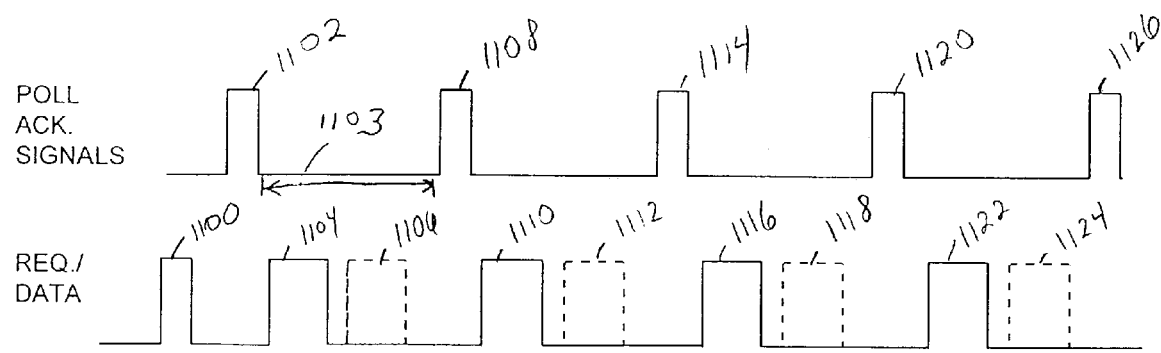
FIG. 11 is a signal transition diagram illustrating a poll interval sharing protocol that allows terminal units to enter and exit reduced noise periods as required during polling intervals.

FIG. 11 illustrates the exchange of signals between units within a wireless communication system during communication wherein two terminal units share polling intervals during communication with a control unit. FIG. 11 also illustrates how a terminal unit may operate in conjunction with a standard communication protocol while still entering and exiting reduced noise periods as required. Polling signals 1102, 1108, 1114, 1120 and 1126 are transmitted from a control unit to a terminal unit to indicate that the control unit will thereafter transmit data to a terminal unit. Data blocks 1104, 1106, 1110, 1112, 1116, 1118, 1122 and 1124 represent data packets transmitted from the control unit.

Signal 1100 represents a request for polling signal that is transmitted from a terminal unit to a control unit. The request for polling signal may specify certain data packet sizes, data rates, data packet durations and durations between polling signals from the control unit. The control unit responds to the request for polling signal 1100 with a polling signal 1102 which includes information relating to which terminal unit is to receive subsequently transmitted data, the format of the subsequently transmitted data and expected number of polling cycles to transmit the data to the terminal unit. Polling frame 1103 (or polling interval) represents the duration between an end of one polling signal and the beginning of an adjacent polling signal. During the polling frame 1103, data is transmitted from a control unit to at least one terminal unit.

Data block 1104 represents a data packet transmitted from the control unit to a first terminal unit. Data block 1106 represents a data packet transmitted from the control unit to a second terminal unit. The data blocks 1104 and 1106 are non-overlapping in time so that the first terminal may receive data block 1104 and the second terminal may receive data block 1106. Thus, the communication protocol illustrated allows for multi-unit communication during a common polling and data transmission sequence.

By sharing polling frames, the units may enter and exit reduced noise periods without affecting communication. For example, during polling frame 1103, the first terminal unit only need be enabled to receive data during data block 1104. Thus, the first terminal unit may exit the reduced noise period after the receipt of data block 1104 and nor reenter the reduced noise period until just prior to the expected receipt time of polling signal 1108. Likewise, the second terminal may exit a reduced noise period after receipt of polling signal 1102 and not reenter the reduced noise period unit receipt of data block 1106 is required. Thus, it may perform other processing functions when it is not required to receive transmissions.

In another mode of operation, a terminal unit does not receive data every polling cycle. For example, the terminal unit operates only to receive data blocks 1104, 1116, etc. By effectively ignoring every other data block, the transmission from the control unit is extended to twice its length but the terminal unit may perform processing functions when not receiving data. In this mode of operation, adjacent polling intervals could be shared by multiple terminal units controlled by a common control unit. For example, operation in this mode would allow a first terminal unit to receive data respective to polling signals 1102, 1114, 1126 etc. and a second terminal unit to receive data respective to polling signals 1108, 1120, etc. Thus, instead of sharing transmission capability within polling intervals, the terminal units would share transmission capability in adjacent polling intervals. This pattern could be repeated as well and adjusted based upon the data transmission requirements of the terminal units.

After receipt of data, each of the terminal units responds to the control unit stating whether the data was received and whether it was received correctly. These notifications are not explicitly shown in FIG. 11 but would be sent to the control unit either immediately after receipt of a block or after all data was sent by the control unit. The control unit uses these notifications in determining whether to send more data to the terminal units and what data to send to the terminal units. If the notification indicates that data was not received but that communications should continue, the control unit resends data. If the notification indicates that the data was received and that communications should continue, the control unit sends more data. If the notification indicates that the terminal unit desires no more data, the control unit ceases sending data to the respective terminal unit. Such would be the case, for example, if the terminal unit was interrupted by a higher priority event, such as a scanning request that required the terminal unit to perform processing functions. If this was the case, the terminal unit would signal the control unit to cease sending data, the terminal unit would exit the reduced noise period and service the interrupt.

In another mode of operation, the terminal unit continues receiving data blocks until it is required to exit the reduce noise period and resume processing functions. At this time it simply ceases responding to the terminal and resumes processing. The control unit determines that the terminal unit is no longer communicating when it fails to receive notification that data has been received. Thus, the control unit continues to buffer the data until the terminal unit makes another request for the data and receives the data.

In still another mode of operation, if the terminal unit fails to notify the control unit that it has received a block of data, the control unit sends the block of data again during the next polling cycle and continues to send it for a certain number of cycles without response from the respective terminal unit. After the certain number of cycles with no response from the terminal unit, the control unit ceases communicating with the terminal unit. However, if the terminal unit responds to the control unit within the certain number of cycles, communications continue. Thus, for example, the terminal unit could receive data block 1104, ignore data blocks 1110 and 1116 without response, and then receive data block 1122 which is identical to data block 1110. By ignoring data blocks 1110 and 1116, the terminal unit may perform processing functions as required.

Thus, the wireless communication system of the present invention provides many important advantages over the prior devices. Various other modifications will now become apparent to those skilled in the art in view of the above detailed description of the drawings The claims below encompass the disclosed embodiments and all modifications and variations that could be made without departing from the spirit and scope of the invention.

The invention claimed is:

1. A wireless communication system comprising:
   terminal circuitry;
   a radio operably coupled to the terminal circuitry; and
   noise management circuitry coupled to the terminal circuitry and radio that selectively alters operation of the terminal circuitry to reduce generated background noise during a wireless receipt by the radio, wherein the noise management circuitry monitors the strength of incoming radio signals with the terminal circuitry in a reduced noise state and then calculates an attainable signal to noise ratio with the terminal circuitry in a non-reduced noise state, selectively alters or does not alter such operation of the terminal circuitry.

2. The wireless conunnication system of claim 1, wherein the noise management circuitry may be interrupted during receipt of transmissions of data by a higher priority terminal unit event to terminate receipt of the transmissions of data.

3. The wireless communication systems of claim 1, wherein the noise management circuitry selectively adjusts terminal circuitry operating frequency.

4. The wireless communication system of claim 1, wherein the noise management circuitry selectively masks interrupts.

5. The wireless communication system of claim 4, wherein the noise management circuitry provides interrupt persistence.

6. The wireless communication system of claim 1, wherein the radio further comprises a received signal strength indicator, and wherein the noise management circuitry selectively disables operation of the tenninal circuitry based upon an output of the received signal strength indicator.

* * * * *